D. W. & S. H. DAVIS.
Preparing Fish for Market.

No. 161,596.  Patented April 6, 1875.

Attest:

Inventors:
D. W. and S. H. Davis
By N. Crawford, atty.

UNITED STATES PATENT OFFICE.

DAVID W. DAVIS AND SAMUEL H. DAVIS, OF DETROIT, MICHIGAN.

IMPROVEMENT IN PREPARING FISH FOR MARKET.

Specification forming part of Letters Patent No. 161,596, dated April 6, 1875; application filed January 29, 1875.

*To all whom it may concern:*

Be it known that we, DAVID W. DAVIS and SAMUEL H. DAVIS, of Detroit, in the county of Wayne, in the State of Michigan, have jointly invented certain Improvements in Preparing Fish for Market, of which the following is a specification:

Fish have been frozen and kept in a frigid state for the purpose of keeping them fresh, and for transportation to distant markets, and such fish have been frozen singly or in small parcels, and packed in ice singly or separately in casks or boxes, with ice or refrigerating substances; or, after being frozen, are kept in a chamber at or below the temperature of freezing, until disposed of or consumed.

In handling fish, when frozen either singly or in small parcels, they are liable to be broken, and when broken the sale of them is destroyed, or the price very much reduced.

In order to obviate such loss this invention is produced; and it consists in freezing several fish in pans of the proper shape, and in such manner that a series of such cakes will fill a cask or box when packed for transportation, and kept at or below the freezing-point, and when arrived at their destination the cask or box can be opened and a single frozen cake taken from the package to be disposed of without in any way disturbing any other cake in the package.

Figure 1:
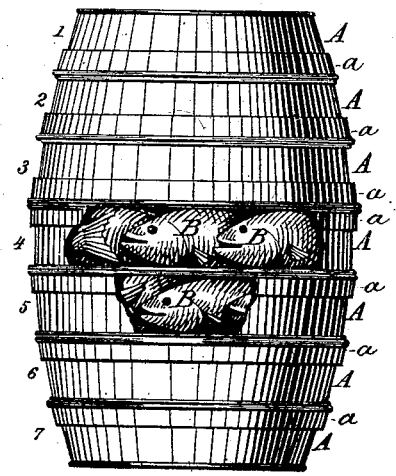
Figure 2:
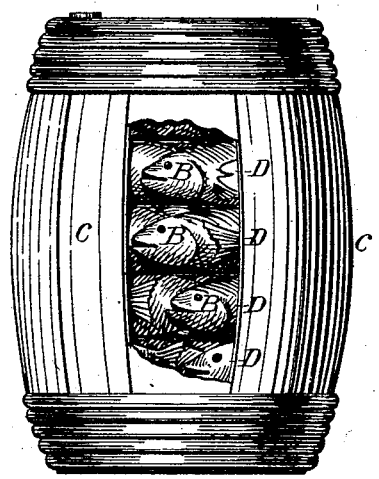
Figure 3:

In the drawings, Figure 1 represents a series of seven round pans, the inside diameter and height of which, when in the position shown, will just fill a barrel, and in which the fish are frozen in cakes. Fig. 2 represents a barrel, with the side partly broken away to show the cakes of frozen fish after being frozen and packed; and Fig. 3 is a perspective view of a single cake of frozen fish.

A A represent a series of seven pans, of the size in diameter and together in height of inside measure that will just fill a barrel or cask, and in which the fish are to be frozen. These have covers *a*, so that when the fish are packed closely in the pans, the cover *a* is put and pressed down upon the fish, that the proper thickness will be given to the cakes of fish when frozen.

Any odd number of pans may be used to make the complement to fill the barrel; but we have taken seven as most convenient.

The fish are all packed to be backs up, and each head to overlap the body of the advance one, or in such other way as to keep the fish in such a position as to avoid the danger of being broken by handling after being frozen.

As an average, fifteen fish are packed in each pan, which will give two hundred pounds net in the barrel of seven cakes, and each fish to weigh about two pounds.

When the pans are so packed with the fish, they are then with the fish placed in the freezing-chamber and frozen in the usual manner, and when frozen through, the cover *a* of the pans is removed, when the cakes of frozen fish will easily come from the pans, and are then immediately packed in the barrel.

It will be observed that in the series of seven pans, the pans numbered 1 and 7 (the bottom and top ones) are the same size, and the same with 2 and 6, and 3 and 5, but increasing in their diameters, while 4 occupies the center or bilge of the barrel, and of course is the largest in diameter.

B B represent the fish as in the pan and in the cake after being frozen. C represents the barrel or cask in which the seven cakes of frozen fish are packed, so as to just closely fill it. D represents one of the series of cakes of frozen fish as it comes from the freezing-pans A, and ready for packing in the barrel.

It is obvious that if other-shaped packages than barrels are to be used for packing the cakes of frozen fish in, the shape of the pan will be varied to suit the form of the package; but it is preferable to pack in barrels, as they are handled in such manner that there is less liability of breaking the fish or cakes than if packed in packages of other forms, and especially of rectangular shape.

After the cakes of frozen fish are packed in the barrel, the barrel is immediately headed up and the hoops driven tightly down, so as to exclude air, when the barrels are placed in a refrigerating-chamber at or below the freezing-point for storage, or in cars or vessels, having that temperature, for transportation.

This method of preparing fish for market, and the advantages of handling them when so prepared, lessens the labor in both, and secures the packer and dealer against loss or shrinkage.

Having thus described our invention, what we claim is—

1. The mode of preparing fish for transportation and market by freezing them into cakes suitable to be packed in casks or other packages, substantially as described.

2. As an improved method of preparing fish for market, the series of cakes D of frozen fish, arranged as to size and height to completely fill the barrel or package C, substantially as described.

DAVID W. DAVIS.
SAMUEL H. DAVIS.

Witnesses:
JAS. O. MELICK,
JAMES McKENZIE.